(12) United States Patent
Noordstrand et al.

(10) Patent No.: US 9,669,910 B2
(45) Date of Patent: Jun. 6, 2017

(54) CLEANING HEAD FOR CLEANING A SURFACE, DEVICE COMPRISING SUCH CLEANING HEAD, AND METHOD OF CLEANING

(71) Applicants: A.M.N. DEVELOPMENT B.V., Delft (NL); C.P.M. DE VET HOLDING B.V., Delft (NL)

(72) Inventors: Alexander Michaël Noordstrand, Delft (NL); Cornelis Petrus Maria De Vet, Delft (NL)

(73) Assignees: A.M.N. Development B.V., The Hague (NL); C.P.M. De Vet Holding B.V., The Hague (NL)

( * ) Notice: Subject to any disclaimer, the term of this patent is extended or adjusted under 35 U.S.C. 154(b) by 135 days.

(21) Appl. No.: 14/391,819

(22) PCT Filed: Apr. 10, 2013

(86) PCT No.: PCT/NL2013/050261
§ 371 (c)(1),
(2) Date: Oct. 10, 2014

(87) PCT Pub. No.: WO2013/154426
PCT Pub. Date: Oct. 17, 2013

(65) Prior Publication Data
US 2015/0158565 A1    Jun. 11, 2015

(30) Foreign Application Priority Data
Apr. 10, 2012  (NL) ..................................... 2008617

(51) Int. Cl.
*B63B 59/10* (2006.01)
*B08B 3/02* (2006.01)
(Continued)

(52) U.S. Cl.
CPC .............. *B63B 59/10* (2013.01); *B08B 3/024* (2013.01); *B60B 39/00* (2013.01); *B62D 61/08* (2013.01)

(58) Field of Classification Search
CPC ......... B08B 3/024; B63B 59/06; B63B 59/10; B63B 2737/00; Y10S 180/901
See application file for complete search history.

(56) References Cited

U.S. PATENT DOCUMENTS 4,029,164 A * 6/1977 Urakami ................ B62D 37/00
114/222

FOREIGN PATENT DOCUMENTS

| EP | 1216761 A1 | 6/2002 |
| EP | 1886904 A2 | 2/2008 |
| GB | 1270117 A | 4/1972 |

* cited by examiner

*Primary Examiner* — David Cormier
(74) *Attorney, Agent, or Firm* — The Webb Law Firm (57) ABSTRACT

Cleaning head (22), cleaning device (8) comprising one or more cleaning heads (22), and a method for cleaning a surface, such as a ship's hull. The cleaning head (22) comprises: —a frame (18) comprising a nozzle shaft (32); —one or more nozzles (44) for cleaning the surface that are connected to the nozzle shaft (32) of the frame (18), with rotating means such that the nozzles (44) are rotatable around magnetic positioning means (46, 42); —magnetic positioning means (46, 42) for positioning the head (22) relative to the surface that are provided or attached to the frame (18); and—an activating element for manipulating the distance between the surface and the positioning means (46, 42), the activating element being connected to the positioning means, wherein the magnetic positioning means (46, 42) are movable between at least a first state and an active second state.

14 Claims, 6 Drawing Sheets

(51) Int. Cl.
*B60B 39/00* (2006.01)
*B62D 61/08* (2006.01)

CLEANING HEAD FOR CLEANING A SURFACE, DEVICE COMPRISING SUCH CLEANING HEAD, AND METHOD OF CLEANING

CROSS-REFERENCE TO RELATED APPLICATIONS

This application is the United States national phase of International Application No. PCT/NL2013/050261 filed Apr. 10, 2013, and claims priority to Netherlands Patent Application No. 2008617 filed Apr. 10, 2012 the disclosures of which are hereby incorporated in their entirety by reference.

BACKGROUND OF THE INVENTION

Field of the Invention

The present invention relates to a cleaning head for cleaning a surface, such as a ship's hull. The cleaning head can also be used for cleaning a storage tank and other surfaces including a surface of a ship's lock door.

Description of Related Art

Offshore and marine industry, including transport by ships, involve large (steel) structures that are exposed to a wide range of conditions for relatively long periods of time. To secure a correct operation of these structures maintenance and care is important. For example, a ship's hull is fouled with marine organisms that increase the drag of the ship thereby increasing fuel consumption and engine wear, and decreasing the maneuverability of the ship. Already a small layer of fouling, such as a slime layer, is sufficient to cause aforementioned negative effects. In addition, the emission of gasses such as $NO_x$, $SO_x$ and $CO_2$ is increased by this fouling. Cleaning is mostly done in outside ports or in dry docks, or alternatively, to some extent during loading and unloading of the ship. As cleaning requires the removal of fouling on surfaces both under and above water, in practice ships are regularly subjected to cleaning and inspection. Similar cleaning and inspection is required for offshore structures, dry docks, and bridge columns.

In the field of cleaning devices for surfaces that are subject to the environment there are several types of cleaning robots, either remotely controlled or autonomous.

EP 1886904 discloses a climbing cleaning robot with high adherence magnets to attach to the metal surface, four drive wheels that are grouped in a rectangular configuration and a cleaning mechanism and the magnets located between the wheels. The magnets can be turned in an inactive state due to the connection of the magnets with a cylinder fixed to the chassis, which is able to move the magnets to the inactive state. Due to the specific configuration of the wheels in relation to the magnets and the cleaning mechanism, the robot is suited for flat surfaces instead of surfaces that are curved in three dimensions.

EP 1 216 761 discloses a device for hydrodynamic cleaning of surfaces. The device comprises a collector, a stator, a rotor comprising radial piping and high pressure-flow generators. The housing appears as a hollow shaped disk with at least one lower shaped surface and partially filled with a shifting ballast.

Relating to the attachment of a device to a surface, GB1270117 discloses a carriage or trolley for travel along an upright wall of magnetisable material. The device comprises magnetic means for attachment to the surface, that is kept at a fixed distance from the surface due to the runner wheels on the device.

The present invention has for its object to obviate or at least reduce the above stated problems.

SUMMARY OF THE INVENTION

The present invention provides for this purpose a cleaning head for cleaning a surface, such as a ship's hull, the cleaning head comprising:

a frame comprising a nozzle shaft;

one or more nozzles for cleaning the surface that are directly or indirectly connected to the nozzle shaft of the frame for providing a fluid to the surface to be cleaned;

magnetic positioning means for positioning the head relative to the surface that are provided or attached to the frame; and an activating element for manipulating the distance between the surface and the positioning means, the activating element being connected to the positioning means, wherein the magnetic positioning means are movable between at least a first state wherein the head moves freely, and an active second state wherein the head is movable connected to the surface, and further comprising rotating means such that the nozzles are rotatable around the magnetic positioning means.

By providing magnetic positioning means, including both ferromagnetic and electromagnetic positioning means, a cleaning head can be positioned relative to the surface to be cleaned. This surface to be cleaned can be above or below water and may comprise a ships's hull, a tank surface, doors or gates for ships lock, and relatively static constructions in the offshore industry. The fouling on these structures increases drag forces on the structure and deterioration of the coating and construction. Cleaning involves removal of fouling, paint, surface layers, etc. Regular cleaning according to the present invention would decrease environmental loads and the need for maintenance of the parts of the construction being exposed to the environment.

By providing an activating element the distance between the surface and the positioning means can be manipulated. The activating element moves the positioning means between at least two different states. In a first state, the cleaning head moves freely from the surface and can be positioned at a surface location requiring cleaning for example. In an active second state the actual cleaning of the surface is performed, wherein the cleaning head can be put to operation. In this second state the magnetic positioning means are magnetically attached to the surface to be cleaned.

The activating means manipulate the distance or gap between the (permanent) magnetic positioning means and the surface to be cleaned. A small gap provides a relatively strong connection between the head and the surface to be cleaned, and enables moving the device over the surface to be cleaned. In case the alternative electromagnets are used the level of the supplied electrical power determines the strength of the attachment of the device according to the invention with the surface to be cleaned.

Optionally, intermediate states could be arranged. For example, in such intermediate state some connection between the cleaning head and the surface to be cleaned is still maintained, however, this connection is less strong as compared to the second state wherein the actual cleaning is performed. Such intermediate state would enable a more easy movement of the cleaning head over the surface without completely disconnecting the cleaning head from the surface.

The cleaning head is provided with one or more nozzles that channel the pressurized fluid on to the surface.

The nozzles are directly or indirectly connected to the nozzle shaft. For example, in a presently preferred embodiment the nozzles are attached to nozzle arms that are connected to a rotatable housing that is capable of rotating around the nozzle shaft.

This fluid may comprise water and/or air. Additionally, the fluid may comprise abrasives and/or other components. The pressurized fluid removes the fouling and/or paint and/or other components from the surface to be cleaned. Preferably, the nozzles are provided on a rotating ring that rotates the nozzles around the nozzle shaft of the frame corresponding to an axis of the cleaning head. This increases the surface area that can be cleaned in one position of the cleaning head.

The cleaning head further comprises rotating means such that the nozzles are rotatable around the magnetic positioning means. By having the nozzles rotated when the cleaning head is in use a larger surface area can be cleaned. Preferably the nozzles are provided on a ring that rotates around these magnetic positioning means.

Preferably, the cleaning head is integrally provided with the positioning means. By integrally providing the magnetic positioning means provides the capability to follow the curvature of the surface. For example, such curvature is relevant for a ship's hull. This significantly improves the applicability of the cleaning head according to the invention.

According to the invention the functions of cleaning curved surfaces and the attachment of the device to the surface are combined. Due to the integration of cleaning technology with magnetic attachment means, the present invention provides a solution for the specific requirements when cleaning surfaces, especially including curved surfaces, while the device is able to achieve high cleaning speeds and may optionally be optimized to capture the removed debris as well.

In an advantageous preferred embodiment according to the present invention the activating element comprises a hydraulic or pneumatic control cylinder wherein the positioning means is movable between the at least first and second state.

By providing a pneumatic or hydraulic cylinder the air gap between the magnetic element of the positioning means and the surface to be cleaned can be controlled. In the first state, the air gap is relatively large such that the cleaning head can be moved freely from the surface, while in the second state the air gap is relatively small such that the cleaning head is more or less fixed to the surface to be cleaned. In both states the air gap ensures that the surface to be cleaned is not damaged by a cleaning head. This maintains the protective performances of coatings and the fouling layers, for example.

Preferably, the positioning means comprises a permanent magnet. The use of a permanent magnet guarantees that the cleaning head stays connected to the ship's hull both above and under water even in case of malfunctioning of the electric supply. Furthermore, permanent magnets have a high attachment force/magnet weight or size ratio as compared to electromagnets. In addition, in a presently preferred embodiment a metal strip is provided on at least one side of the permanent magnet to increase the magnetic field and thereby enhance the capabilities of handling the cleaning head relative to the surface. This reduces the number of magnets that are required thereby making handling of the cleaning head more easy and reducing the costs associated with the cleaning head according to the invention.

Preferably, the positioning means is provided at or around a shaft of the cleaning head. As mentioned before, providing a cleaning head integrated with the positioning means improves the capability of cleaning surfaces with a relatively large curvature. In a presently preferred embodiment the shaft is positioned at or close to the central axis of the cleaning head. Preferably, one or more of the supplies for the activating element are positioned in the internal of the shaft. This prevents additional pipes or hoses to be used.

In an advantageous preferred embodiment according to the present invention the rotating means comprise a rotatable housing with arms to which the nozzles are attached.

By providing a rotatable housing with arms with nozzles attached to these arms in use a larger surface area can be cleaned. As mentioned before, the nozzles are preferably provided on a type of ring, or other circular shape, that rotates around these magnetic positioning means.

Preferably, the nozzles are provided at a non-perpendicular angle to the surface such that a rotating movement is achieved when the cleaning head is in use. By providing the nozzles with an inclination relative to a perpendicular line of the surface to be cleaned, the nozzles power the rotational movement of the ring such that no external drive, or at least a reduced drive, is required.

In a further advantageous preferred embodiment according to the present invention the cleaning head comprises three support-and-moving means.

By providing three support-and-moving means a stable construction is achieved. Preferably, these means involve wheels and/or rollers that enable moving the cleaning head over the surface to be cleaned.

In a presently preferred embodiment the support-and-moving means are attached or connected to the shaft such that the nozzles may rotate around the shaft and the support-and-moving means. In this embodiment the positioning means, preferably comprising a permanent magnet, is also connected to the shaft such that the nozzles may also rotate around the positioning means.

Optionally, the support-and-moving means comprise connecting means for connecting to a power source for driving the cleaning head. When the nozzles rotate around the shaft and the support-and-moving means at the same time, the cleaning head substantially moves over a clean surface when in use.

Preferably, the cleaning head comprises suction means. The suction means remove loose parts from the surface. Such parts may relate to fouling and/or paint that is removed by the nozzles. By providing suction means it is prevented that such parts enter the environment. Preferably, the suction means is incorporated in a housing of the cleaning device. This housing involves a double-walled housing with the suction means provided between the inner and outer wall.

The present invention further relates to a cleaning device for cleaning a surface, such as a ship's hull, comprising:
 a frame with one or more cleaning heads as described above; and
 a drive for moving the device.

Such a cleaning device provides the same effects and advantages as described for the cleaning head. The cleaning device can be used for cleaning a surface that is partly above and partly under water by providing relevant parts with a water tight casing.

Applying more than one cleaning head for a device significantly improves the cleaning performance due to the multiple head configuration as compared to a circumferential cleaning, for example.

Preferably, the cleaning device comprises one or more units that each are provided with one or more cleaning heads. Providing the one or more units with more than one cleaning head enables the use of a central suspension that provides more balance to the device according to the invention.

More preferably, the cleaning head is provided with three cleaning heads, that are connected to a triangular sub frame. In a presently preferred embodiment according to the invention the cleaning heads are capable of rotating relative to the sub frame. The sub frame is connected to the frame that houses the drive for moving the device, using a cylinder or other suspension, thus resulting in a flexible suspension for the three cleaning heads. This ensures that the cleaning heads will perfectly follow curved surfaces. In addition, the unit comprising the three cleaning heads will exert a force on the cleaning heads away from the surface to be cleaned. Due to the magnetic positioning means in the cleaning heads, in their active state, the frame that is attached to the unit comprising the cleaning heads will stay connected to the surface to be cleaned. Optionally, extra magnetic positioning means can be attached to the frame thereby creating an even higher attachment force to the surface.

In a presently preferred embodiment of the cleaning device the device comprises inspection means and/or paint spray means. This enables inspection of the surface. The inspection means may comprise a camera or sensor to measure the thickness of the surface, coating thickness, and corrosion inspection, for example. The paint spray means enable providing a coating or other layer on the surface.

The present invention further also relates to a method for cleaning a surface, such as a ship's hull, the method comprising the steps of:
  providing a cleaning device as described above;
  positioning the device on the surface; and
  cleaning the surface.

Such a method provides the same effects and advantages as described for the cleaning device and/or the cleaning head.

In a presently preferred embodiment loose parts are removed by suction means as described above.

BRIEF DESCRIPTION OF THE DRAWINGS

Further advantages, features and details of the invention will be elucidated on the basis of preferred embodiments thereof, wherein reference is made to the accompanying drawings, in which:
FIG. 2 A-C shows the device of FIG. 1;
FIG. 3 A-D shows a cleaning head of the device of FIG. 1;
and
  FIG. 4 A-E shows some details of the device of FIG. 1.

DETAILED DESCRIPTION OF THE INVENTION

Figure 1:
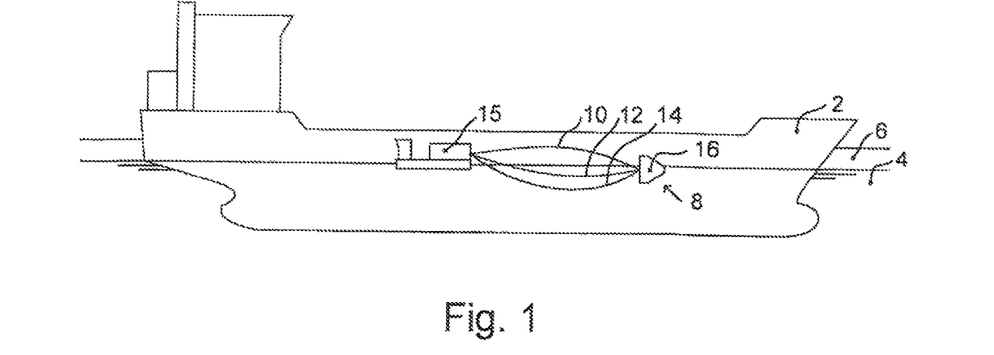
FIG. 1 shows a ship being cleaned by the device according to the invention.

A ship 2 (FIG. 1) is partly below water 4. In the illustrated embodiment ship 2 is positioned along a quay 6. Ship 2 is cleaned with cleaning device 8 and is provided with power supply 10, air supply 12, and water supply 14, in the illustrated embodiment all connected to supply device 15. Device 8 is optionally provided with a drain pipe (not shown) and a housing 16.

Figure 2A:
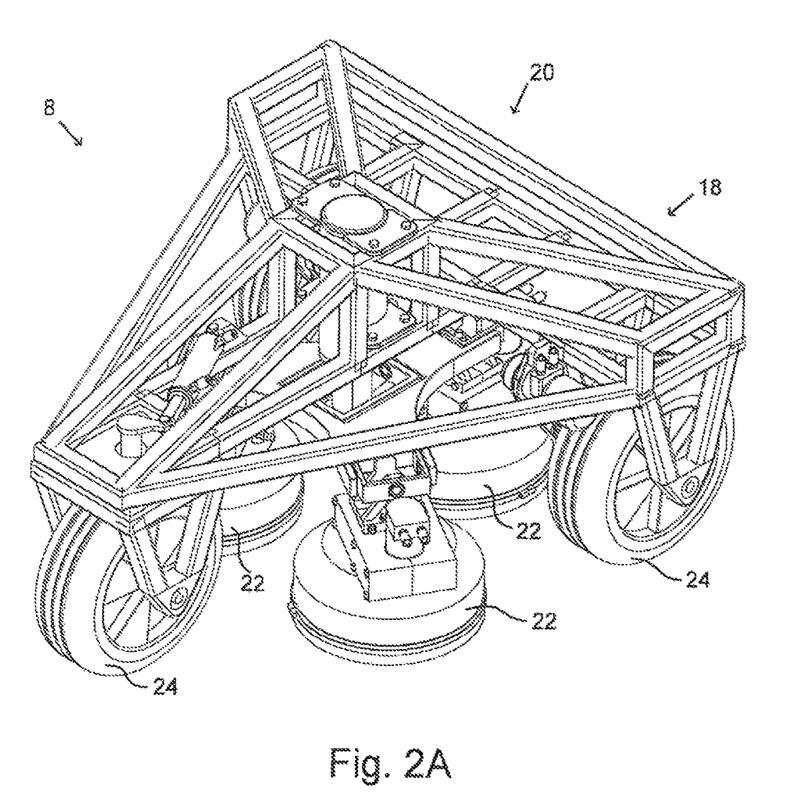
Figure 2B:
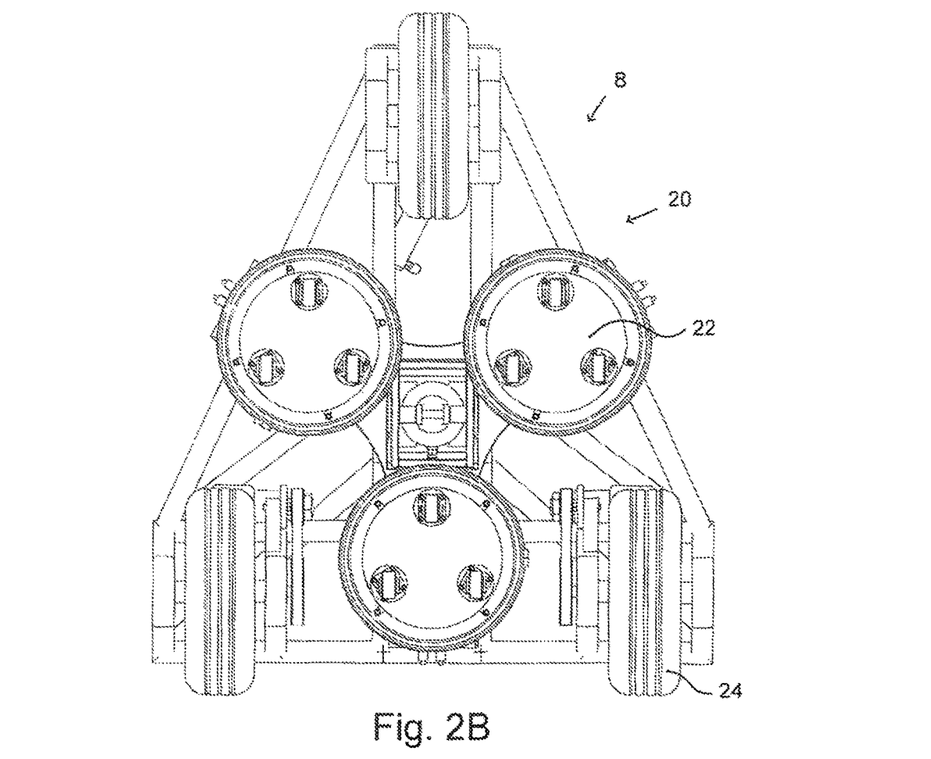
Figure 2C:
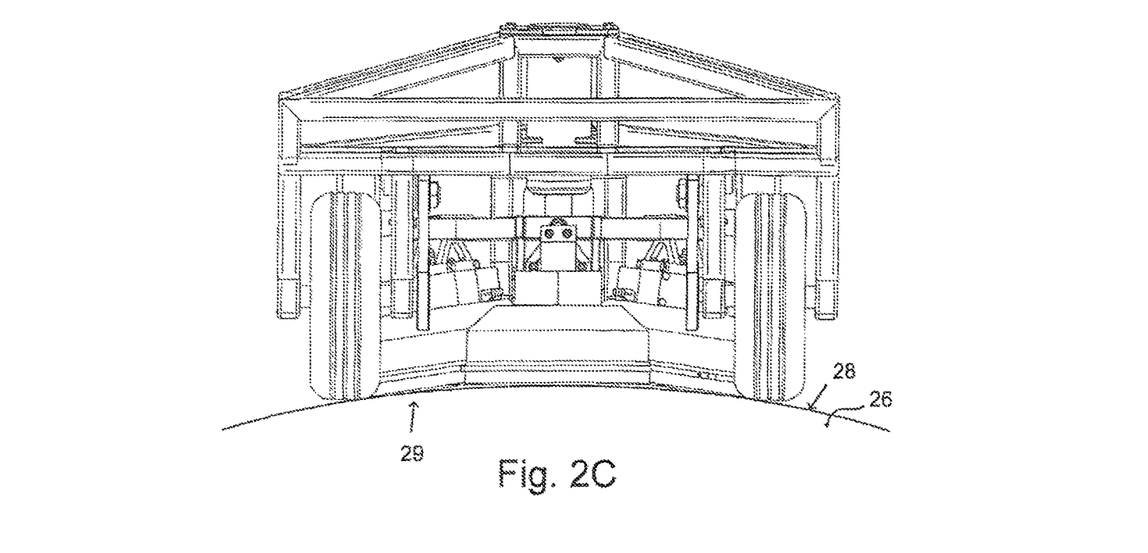

Device 8 (FIG. 2 A-C) is provided with frame 18 that in use is covered by housing 16 (not shown). In the illustrated embodiment frame 18 comprises cleaning unit 20 that is provided with three cleaning heads 22. Device 8 is movable using three wheels 24 over ships hull 26. In general, a ship's hull 26 is provided with a curvature 28. In the illustrated embodiment device 8 is also provided with a corresponding curvature 29 that is similar to the curvature of ship's hull 26. Optionally, adjusting means (not shown) are provided enabling adjustment of curvature 29 of device 8 to bring it into conformity with that of ship's hull 26.

Cleaning head 22 (FIGS. 3 A-D), using connecting part 30, is attached to unit 20 and frame 18. Cleaning head 22 is provided with shaft 32, motor 34, power supply 36 and water supply 38. Motor 34 drives belt 40 and therewith a number of nozzles 44 that perform the actual cleaning. Magnets 46 are provided in a housing 42. Cleaning head 22 is attached to a ship's hull with magnets 46 and movable over such ship's hull with wheels 48. In the illustrated embodiment each cleaning head 22 is provided with a number of permanent magnets that are provided in an alternating North-South configuration.

Figure 3A:
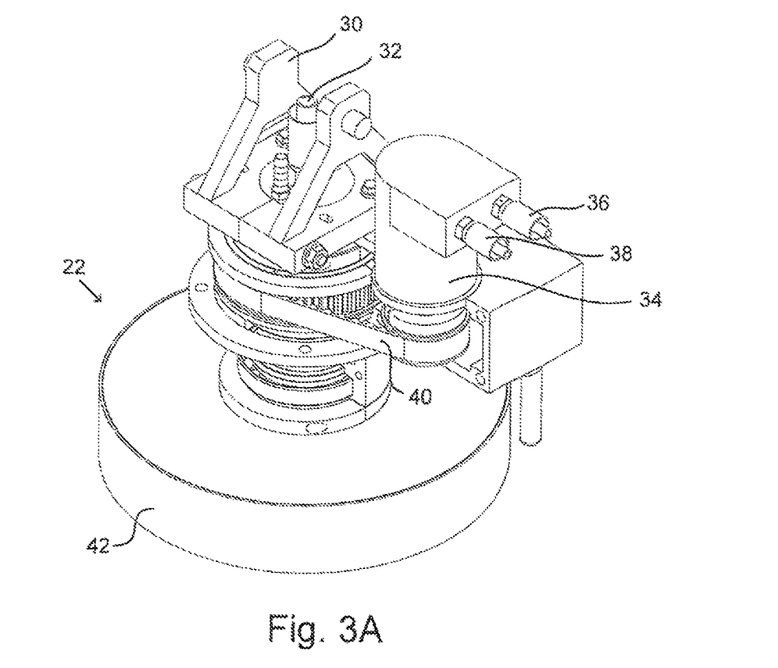
Figure 3B:
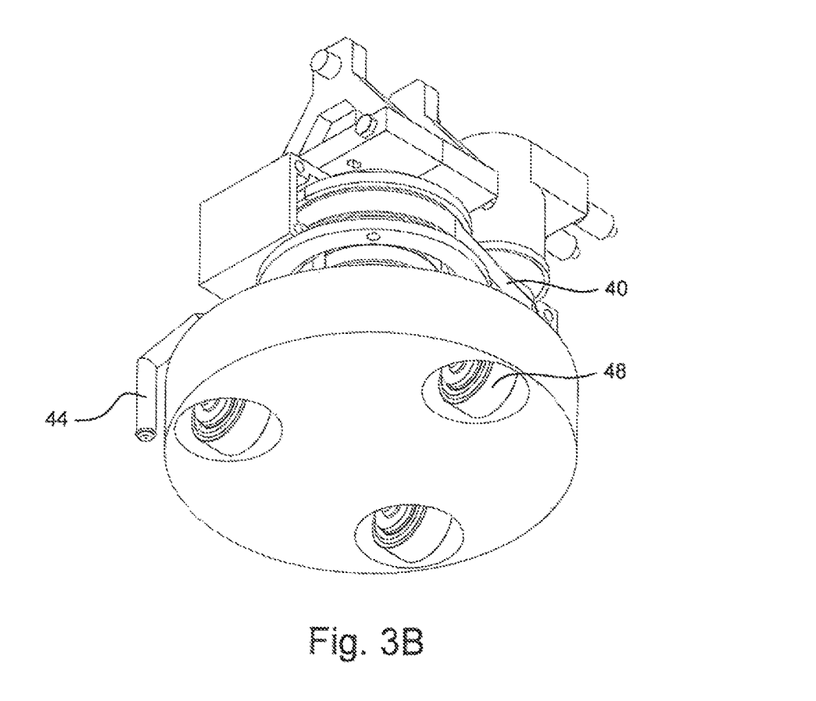
Figure 3C:
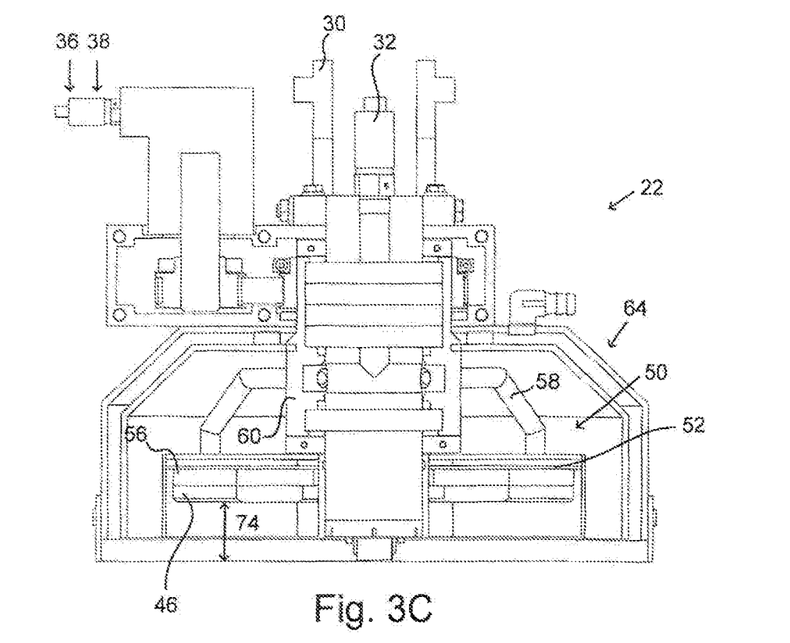
Figure 3D:
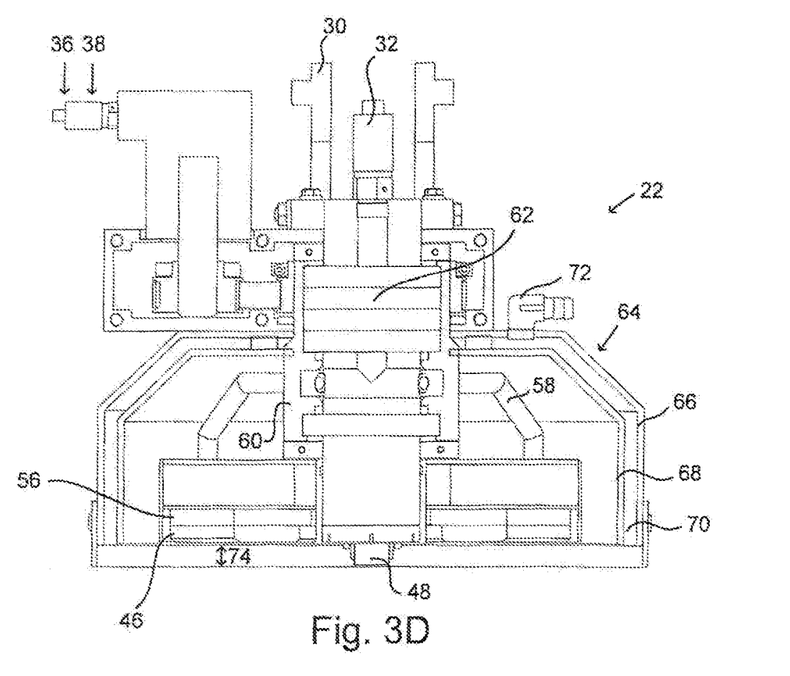
Figure 4A:
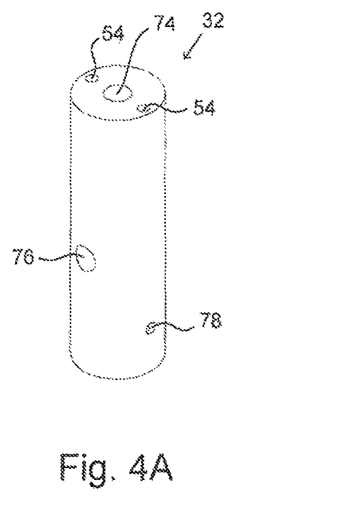
Figure 4B:
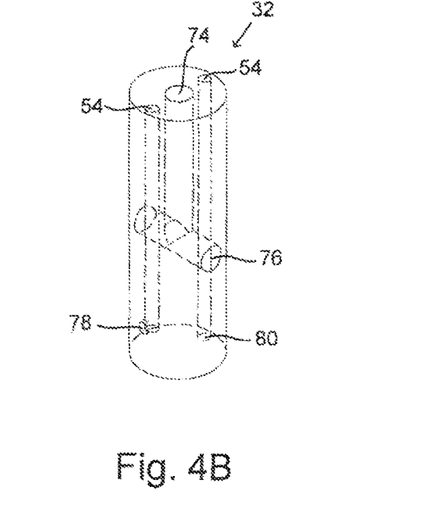
Figure 4C:
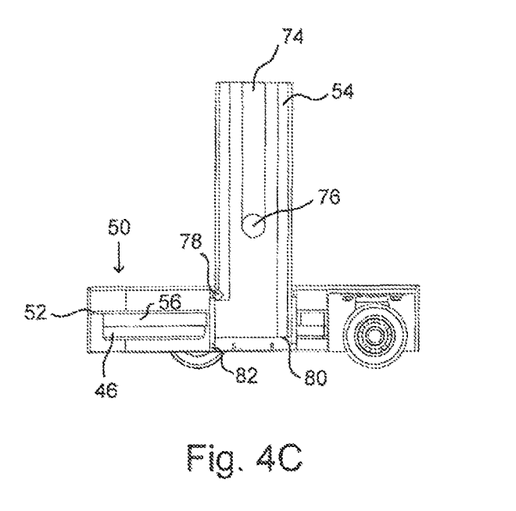
Figure 4D:
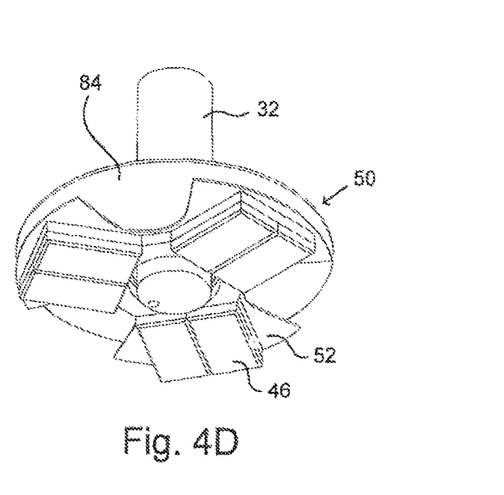
Figure 4E:
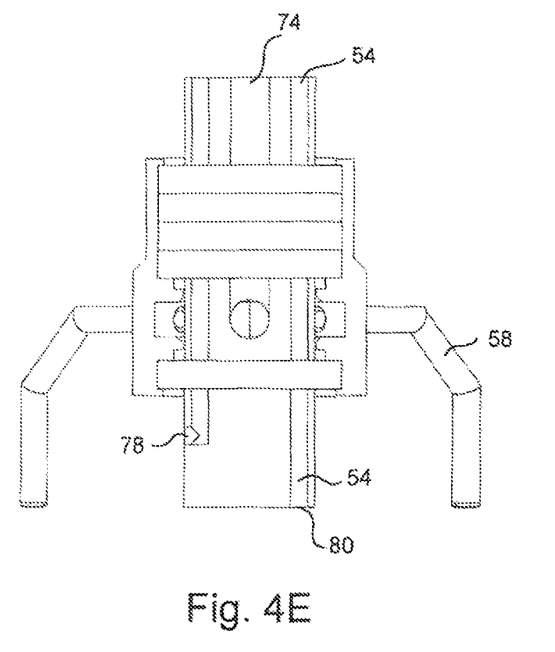

In a first state (FIG. 3 C) cleaning head 22 can be moved freely. In a second attached state (FIG. 3 D) cleaning head 22 is attached to a ship's hull with magnets 46. Shaft 32 is attached to a cylinder 50 with a piston 52. In the illustrated embodiment magnets 46 are attached to piston 52. Above magnets 46 there is provided a metal strip 56 to enhance the magnetic field. Arm 58 for nozzles 44 are rotatable with rotating housing 60 around shaft 32 using bearings 62.

In the preferred embodiment each cleaning head 22 is provided with four nozzles 44 (FIG. 3 C-D). The nozzles rotate with about 500-2000 rpm and preferably operate with a pressure in the range of about 0-1000 bar. The cleaning head 22 is provided with a cover 64 comprising an outer part 66 and an inner part 68. Part 66, 68 are spaced apart thereby performing a suction channel 70 for removal of parts from the ship's hull that are removed with nozzles 44. These parts are removed by drain or outlet 72.

In the illustrated embodiment shaft 32 (FIG. 4 A-E) is provided with supply and retour channels 54 that can be used for manipulating the position of piston 52. In fact, shaft 32 is provided with three channels, two for air supply and return 54 and one for water supply 74. Nozzles rotate around shaft 32 and are provided with water from outlet 76. In the illustrated embodiment piston 52 is moved pneumatically by supply of air through outlets 78, 80 with opening 82. Alternatively, piston can be moved hydraulically or otherwise. In the illustrated embodiment room 84 is provided for wheels 48. Optionally, wheels 48 are provided on the outer periphery of cylinder 50 (not shown).

When a ship's hull 26 needs to be cleaned a device 8 is provided at a desired location on ship's hull 26. Magnets 46 move from a free movable state to the attached state wherein device 8 is attached to ship 2. Next, cleaning starts by providing water to nozzles 44. Nozzles 44 are rotated by starting motor 34. Device 8 moves over surface 26 using wheels 24 to clean the entire surface by providing a water tight casing and/or waterproof part device 8 can move above and below water 4 thereby preventing the ship to be moved out of the water for cleaning purposes. Power is supplied by power supply 10. Alternatively, a battery is supplied in device 8.

In the illustrated embodiment cleaning head is provided with a diameter of about 50 cm and the total width of device 8 is about 1.5 m. Device 8 is manually controlled, or alternatively, controlled automatically using GPS, for example.

The present invention is by no means limited to the above described embodiments thereof. The rights sought are defined by the following claims, within the scope of which many modifications can be envisaged. For example, wheels 48 are provided within housing 42. In an alternative embodiment according to the present invention wheels 42 can also be provided outside housing 42, preferably in the area between nozzles 44 and housing 42. The control channels 44 are provided within shaft 32. Alternatively, supply pipes or hoses can also be provided in a more conventional manner outside cylinder 50. In the illustrated embodiment the rotation is achieved with motor 34. Alternatively, arms 58 are provided under an angle with nozzles 44 such that a rotating movement is achieved when in use.

The invention claimed is:

1. A cleaning head for cleaning a surface, the cleaning head connected to a frame and comprising:
  a nozzle shaft connected to the frame, the cleaning head pivotable relative to the frame;
  at least one nozzle for cleaning the surface that is directly or indirectly connected to the nozzle shaft of the frame for providing a fluid to the surface to be cleaned;
  magnetic positioning means for positioning the head relative to the surface, the magnetic positioning means being provided at or around the nozzle shaft; and
  an activating element for manipulating the distance between the surface and the positioning means, the activating element being connected to the positioning means and positioned at least partially in an interior of the nozzle shaft,
  wherein the magnetic positioning means are movable between at least a first state wherein the head moves freely and an active second state wherein the head is movable connected to the surface and can be put to operation, and further comprising rotating means such that the at least one nozzle is rotatable around the magnetic positioning means wherein the cleaning head is integrally provided with the magnetic positioning means and configured to follow a curvature of the surface.

2. The cleaning head according to claim 1, wherein the activating element comprises a hydraulic or pneumatic controlled cylinder for moving the positioning means between the at least first state and the second state.

3. The cleaning head according to claim 1, wherein the positioning means comprises a permanent magnet and wherein at least one side of the magnet is provided with a metal strip.

4. The cleaning head according to claim 1, wherein the rotating means comprise a rotatable housing with arms to which the at least one nozzle is attached.

5. The cleaning head according to claim 4, wherein the at least one nozzle is provided at a non-perpendicular angle to the surface such that in operation a rotating movement is achieved when the cleaning head is in use.

6. The cleaning head according to claim 1, further comprising three support-and-moving means, with the three support-and-moving means optionally comprising connecting means to connect to a power source.

7. The cleaning head according to claim 1, further comprising suction means to remove loose parts.

8. A cleaning device for cleaning a surface, comprising:
  a second frame connected to the frame with one or more cleaning heads according to claim 1; and
  a drive for moving the device.

9. The cleaning device according to claim 8, further comprising a unit which is provided with one or more cleaning heads and comprising a combined suspension.

10. The cleaning device according to claim 7, wherein the suction means is incorporated in a housing.

11. A method for cleaning a surface, comprising the steps of:
  providing a cleaning device according to claim 8;
  positioning the device on the surface; and cleaning the surface.

12. A cleaning head for cleaning a surface, the cleaning head connected to a frame and comprising:
  a nozzle shaft connected to the frame, the cleaning head pivotable relative to the frame;
  at least one nozzle for cleaning the surface that is directly or indirectly connected to the nozzle shaft of the frame for providing a fluid to the surface to be cleaned;
  magnetic positioning means for positioning the head relative to the surface, the magnetic positioning means being provided at or around the nozzle shaft; and
  an activating element for manipulating the distance between the surface and the positioning means, the activating element being connected to the positioning means and positioned at least partially in an interior of the nozzle shaft,
  wherein the magnetic positioning means are movable between at least a first state wherein the head moves freely, and an active second state wherein the head is movable connected to the surface and can be put to operation, and further comprising rotating means such that the at least one nozzle is rotatable around the magnetic positioning means,
  wherein the cleaning head is integrally provided with the magnetic positioning means and configured to follow a curvature of the surface,
  wherein the activating element comprises a hydraulic or pneumatic controlled cylinder for moving the positioning means between the at least first state and the second state, and
  wherein the positioning means comprises a permanent magnet and wherein at least one side of the magnet is provided with a metal strip.

13. A cleaning head for cleaning a surface, the cleaning head connected to a frame and comprising:
  a nozzle shaft connected to the frame, the cleaning head pivotable relative to the frame;
  at least one nozzle for cleaning the surface that is directly or indirectly connected to the nozzle shaft of the frame for providing a fluid to the surface to be cleaned;
  magnetic positioning means for positioning the head relative to the surface, the magnetic positioning means being provided at or around the nozzle shaft frame; and
  an activating element for manipulating the distance between the surface and the positioning means, the activating element being connected to the positioning means and positioned at least partially in an interior of the nozzle shaft,
  wherein the magnetic positioning means are movable between at least a first state wherein the head moves freely, and an active second state wherein the head is movable connected to the surface and can be put to operation, and
  further comprising rotating means such that the at least one nozzle is rotatable around the magnetic positioning means, wherein the cleaning head is integrally provided with the magnetic positioning means and configured to follow a curvature of the surface, and wherein the activating element comprises a hydraulic or pneumatic controlled cylinder for moving the positioning means between the at least first state and the second state.

14. A cleaning head for cleaning a surface, the cleaning head connected to a frame and comprising:
- a nozzle shaft connected to the frame, the cleaning head pivotable relative to the frame;
- at least one nozzle for cleaning the surface that is directly or indirectly connected to the nozzle shaft of the frame for providing a fluid to the surface to be cleaned;
- magnetic positioning means for positioning the head relative to the surface, the magnetic positioning means being provided at or around the nozzle shaft; and
- an activating element for manipulating the distance between the surface and the positioning means, the activating element being connected to the positioning means and positioned at least partially in an interior of the nozzle shaft, wherein the magnetic positioning means are movable between at least a first state wherein the head moves freely, and an active second state wherein the head is movable connected to the surface and can be put to operation, and further comprising rotating means such that the at least one nozzle is rotatable around the magnetic positioning means, wherein the cleaning head is integrally provided with the magnetic positioning means and configured to follow a curvature of the surface, wherein the positioning means comprises a permanent magnet and wherein at least one side of the magnet is provided with a metal strip, and wherein the rotating means comprise a rotatable housing with arms to which the at least one nozzle is attached.

* * * * *

UNITED STATES PATENT AND TRADEMARK OFFICE
CERTIFICATE OF CORRECTION

PATENT NO. : 9,669,910 B2  
APPLICATION NO. : 14/391819  
DATED : June 6, 2017  
INVENTOR(S) : Alexander Michaël Noordstrand et al.

Page 1 of 1

It is certified that error appears in the above-identified patent and that said Letters Patent is hereby corrected as shown below:

Column 8, Line 54, Claim 13, delete "shaft frame;" and insert -- shaft; --

Signed and Sealed this
Eighth Day of August, 2017

Joseph Matal
*Performing the Functions and Duties of the*
*Under Secretary of Commerce for Intellectual Property and*
*Director of the United States Patent and Trademark Office*